(12) United States Patent
Marsetti et al.

(10) Patent No.: US 11,685,612 B2
(45) Date of Patent: Jun. 27, 2023

(54) MOTORIZED TRANSFER APPARATUS FOR CONVEYORS OF BULK OBJECTS

(71) Applicant: MOVEX S.P.A., Castelli Calepio (IT)

(72) Inventors: Sergio Marsetti, Paradiso (CH); Matteo Marsetti, Telgate (IT)

(73) Assignee: MOVEX S.P.A., Castelli Calepio (IT)

( * ) Notice: Subject to any disclaimer, the term of this patent is extended or adjusted under 35 U.S.C. 154(b) by 61 days.

(21) Appl. No.: 17/553,942

(22) Filed: Dec. 17, 2021

(65) Prior Publication Data

US 2022/0234841 A1 Jul. 28, 2022

(30) Foreign Application Priority Data

Jan. 28, 2021 (IT) .......................... 102021000001676

(51) Int. Cl.
*B65G 47/66* (2006.01)
*B65G 23/02* (2006.01)
*B65G 17/38* (2006.01)

(52) U.S. Cl.
CPC .................................. *B65G 47/66* (2013.01)

(58) Field of Classification Search
None
See application file for complete search history.

(56) References Cited

U.S. PATENT DOCUMENTS 6,196,381 B1    3/2001  Kato et al.
10,233,026 B2 *  3/2019  Rimmington ........... E21C 27/02
10,343,853 B2 *  7/2019  Yasinski ................. B65G 47/66
2006/0252591 A1* 11/2006  Winkelmolen ........ B65G 23/06
                                                                   474/153
2011/0132725 A1   6/2011  Marshall et al.
2019/0389661 A1  12/2019  Wight et al.

FOREIGN PATENT DOCUMENTS

DE    202010006549 U1   8/2010
EP       2000425 A1    12/2008
EP       2014585 A2     1/2009
KR    20210000097 A     1/2021
NL       2002344 C2     6/2010

* cited by examiner

*Primary Examiner* — Kavel Singh
(74) *Attorney, Agent, or Firm* — Dickinson Wright PLLC; Andrew D. Dorisio

(57) ABSTRACT

A motorized transfer apparatus is described, comprising: a conveyor belt movable along a predetermined feeding direction and comprising a plurality of modular elements arranged in closed loop; a support structure comprising a sliding surface having a substantially cross-sectional triangular shape, so as to form in sequence: a first flat portion, which is substantially horizontal and which defines a transport plane for the objects transported by said conveyor belt, a second flat portion, which defines a descent path for the conveyor belt, and a third flat portion, which defines an ascent path for said the conveyor belt. The apparatus further comprises a motorized actuator device for the conveyor belt and a drive unit, inserted inside the support structure and arranged to transmit the motion generated by the motorized actuator device to the conveyor belt. Each modular element has a length, measured along the feeding direction, which is between 1.5% and about 6% of the overall length of the conveyor belt. The third flat portion connects the second flat portion with the first flat portion.

10 Claims, 2 Drawing Sheets

MOTORIZED TRANSFER APPARATUS FOR CONVEYORS OF BULK OBJECTS

This application claims the benefit of Italian Patent Application No. 102021000001676 filed on Jan. 28, 2021, the disclosure of which is incorporated herein by reference.

TECHNICAL FIELD

The present invention generally relates to conveyors of bulk objects and, in particular, a motorized transfer apparatus for conveyors of bulk objects.

BACKGROUND

As is known, a conveyor of bulk objects defines a moving plane for generic objects to be transported. Such a conveyor is generally of the closed or endless loop type and can consist, for example, of a belt, a plurality of interconnected rollers or a belt with articulated links.

Transferring objects between pairs of conveyors arranged in sequence, or from a conveyor to a machine, can be a problem when small objects are transported on large conveyors. Conveyors, in fact, especially if they are large, are equipped with pulleys or end rollers of particularly large diameter to allow the belt, the interconnected rollers or the belt with articulated links to deviate their movement from the forward path to the return path of the respective closed loop. Small objects, therefore, could fall into the gap that inevitably lies at the adjacent ends of pairs of conveyors arranged in sequence.

There are several technical solutions to this problem, such as static transfer plates, idle rollers transfer plates and the use of return guide devices called "nose bars". Each of these technical solutions, however, has both undoubted advantages and also potential deficiencies.

Static transfer plates, for example, are extremely inexpensive and help reduce the space between pairs of conveyors arranged in sequence, but do not keep objects moving during their transfer. Idle roller transfer plates, while less economical than static transfer plates, can keep objects moving during their transfer, but slow them down considerably. The return guide devices ("nose bars") make it possible to considerably approach the adjacent ends of pairs of conveyors arranged in sequence, but they cannot be applied on conveyors which are not suitable for operation with pulleys or small diameter end rollers, especially when these are conveyors with interconnected rollers or articulated links.

Motorized transfer apparatuses have, therefore, been manufactured which, when interposed between the adjacent ends of pairs of conveyors arranged in sequence, allow the transported objects, even if small, not only not to fall from the conveyors, but also to be easily transferred from one conveyor to another while maintaining their transfer speed constant. These motorized transfer apparatuses are usually small in size and are provided with a respective conveyor belt, or a closed loop belt with articulated links. The conveyor belt, or the belt with articulated links, is rotated by means of pulleys or motorized actuator gears which are usually inside the motorized transfer apparatus.

Document DE 20 2010 006549 U1 discloses a motorized transfer apparatus according to the preamble of claim 1. Another motorized transfer apparatus according to the prior art is disclosed in document EP 2000425 A1.

In the event that the motorized transfer apparatus is equipped with a belt with articulated links, an expansion and, therefore, an undesired elongation of this belt with articulated links with respect to the project dimensions is likely to occur in operating conditions. This elongation may be due to the most varied factors, such as the material (usually of a polymeric nature) the links are made with, the temperature variations, the weight of the transported objects, the type of support of these objects on the belt with articulated links, etc. If the elongation of the belt with articulated links is excessive, the actuator gears may no longer perform their function of moving this belt correctly, which belt would therefore be subject to "jumps" and unwanted speed variations.

A possible technical solution to the elongation problem may be to equip the motorized transfer apparatus, internally, with tensioning rollers of the belt with articulated links. However, considering the small size of the motorized transfer apparatus, the presence of these rollers could cause technical problems, or excessively increase the size of the apparatus itself and/or the related costs.

SUMMARY

The object of the present invention is, therefore, to provide a motorized transfer apparatus for conveyors of bulk objects which is capable of solving the aforementioned drawbacks of the prior art in an extremely simple, economical and particularly functional way.

In detail, it is an object of the present invention to provide a motorized transfer apparatus for conveyors of bulk objects, in particular provided with a belt with articulated links, which allows to limit the dilatations and/or elongations of its own belt without the need to use internal tensioning rollers.

Another object of the present invention is to provide a motorized transfer apparatus for conveyors of bulk objects, in particular provided with a belt with articulated links, which is particularly compact and of smaller size than similar apparatuses according to the prior art.

These objects according to the present invention will be achieved by providing a motorized transfer apparatus for conveyors of bulk objects. Further characteristics of the invention are highlighted by the dependent claims, which are an integral part of the present description.

BRIEF DESCRIPTION OF THE DRAWINGS

The characteristics and advantages of a motorized transfer apparatus for conveyors of bulk objects according to the present invention will be clearer from the following exemplifying and hence non-limiting description, referring to the attached schematic drawings in which.

DETAILED DESCRIPTION

Figure 1:
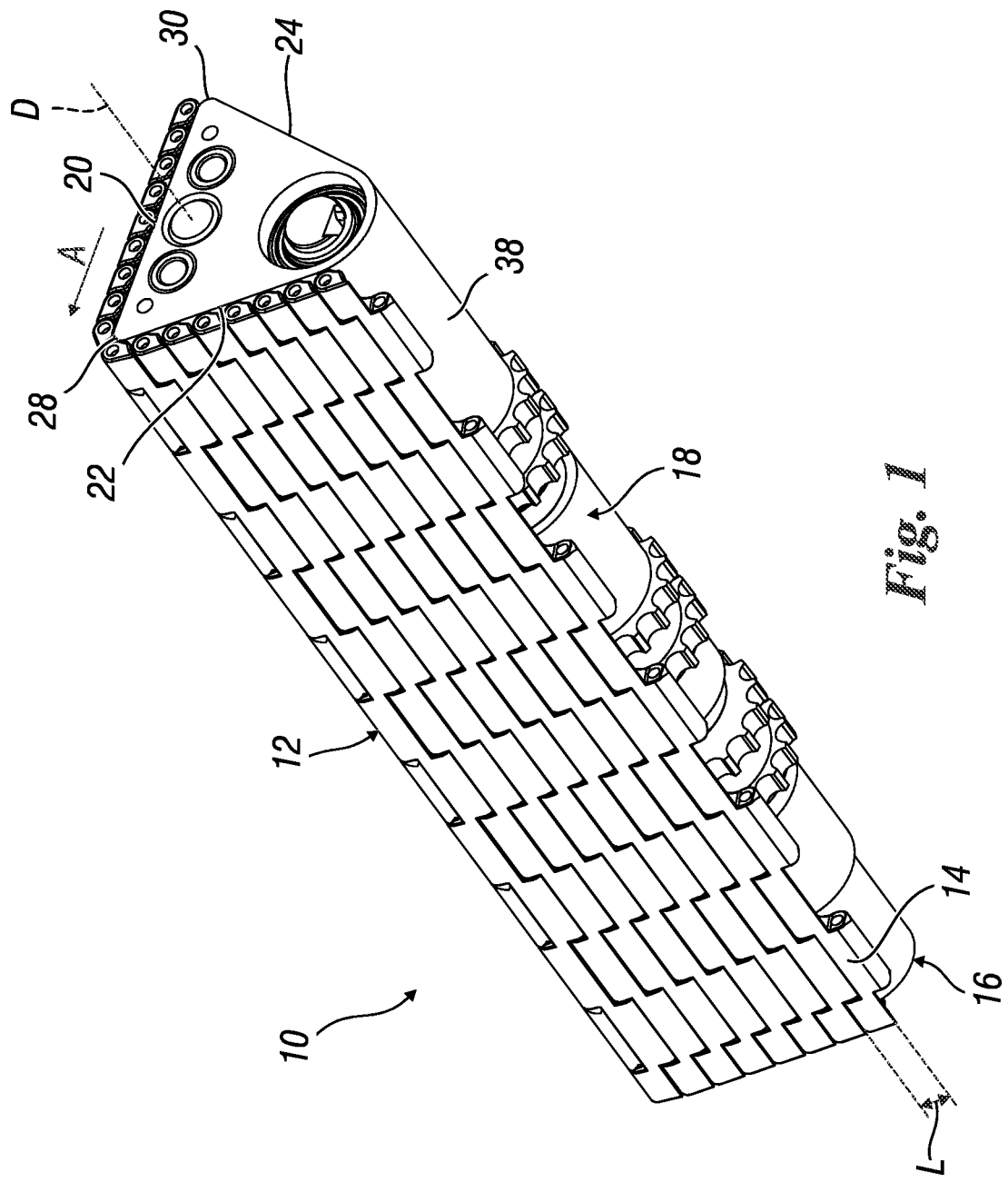
FIG. 1 is a bottom perspective view of a preferred embodiment of the motorized transfer apparatus for conveyors of bulk objects according to the present invention, on which only a part of the respective belt with articulated links is mounted.

With reference to the figures, a preferred embodiment of the motorized transfer apparatus for conveyors of bulk objects according to the present invention is shown. The motorized transfer apparatus is indicated as a whole with reference number 10.

The motorized transfer apparatus 10 comprises, in a per se known manner, a conveyor belt 12 movable along a predetermined feeding direction A. The conveyor belt 12 is of the type comprising a plurality of modular elements 14 arranged in sequence and articulated with one another to form a closed loop conveyor belt 12 with articulated links having a predetermined overall length.

The motorized transfer apparatus 10 further comprises a support structure 16 which, in turn, comprise at least one sliding surface 18 for the closed loop conveyor belt 12 with articulated links. As shown in the Figures, the sliding surface 18 has a substantially cross-sectional triangular shape, that is, a section which is parallel with respect to the feeding direction A of the conveyor belt 12, so as to form in sequence:

- a first flat portion 20 of the sliding surface, which is substantially horizontal in the operating configuration of the motorized transfer apparatus 10 and which defines a transport plane for the objects transported by said conveyor belt 12,
- a second flat portion 22 of the sliding surface, which is inclined downward in the operating configuration of the motorized transfer apparatus 10 and defines a descent path for the conveyor belt 12, and
- a third flat portion 24 of the sliding surface, which connects the second flat portion 22 of the sliding surface with the first flat portion 20 of the sliding surface and defines an ascent path for the conveyor belt 12.

The motorized transfer apparatus 10 also comprises at least one motorized actuator device 26 for the conveyor belt 12, such as an electric motor, and at least one drive unit 32, 34, inserted inside said support structure 16 and designed to transmit the motion generated by the motorized actuator device 26 to the conveyor belt 12. In particular, the drive unit 32, 34 comprises a plurality of drive gears 32, which engage in a per se known manner with each modular element 14 of the conveyor belt 12, and at least one drive shaft 34. The drive shaft 34, again in a per se known manner, can be provided with one or more retaining rings 40 of the Seeger type, so as not to oscillate axially inside the support structure 16, and one or more rolling bearings 42.

Advantageously, each modular element 14 of the conveyor belt 12 has a length L, measured along the feeding direction A of the conveyor belt 12 itself, which is between about 1.5% and about 6% of the overall length of the conveyor belt 12, preferably between about 2% and about 6% of the overall length of the conveyor belt 12. It has in fact been observed that in conveyor belts with articulated modules or links, any elongation of the conveyor belt itself must not exceed the length, or pitch, of a single module or link. Otherwise, in fact, each drive gear would no longer perform its function correctly and possible "jumps" of the conveyor belt could occur.

Preferably, between the first flat portion 20 of the sliding surface and the second flat portion 22 of the sliding surface, as well as between the third flat portion 24 of the sliding surface and the first flat portion 20 of the sliding surface, respective rounded upper connecting portions 28, 30 are provided, which are smooth and have a cross-sectional arc profile. Again preferably, these rounded upper connecting portions 28, 30 have a very small diameter, equal to about 6 mm, but in any case sufficient to make the modular elements 14 of the conveyor belt 12 slide easily along the triangular sliding surface 18.

Between the second flat portion 22 of the sliding surface and the third flat portion 24 of the sliding surface a further rounded lower connecting portion 38, smooth and having a cross-sectional arc profile can be provided. This rounded lower connecting portion 38 has, however, a diameter which is greater than the diameter of the rounded upper connecting portions 28, 30, since a plurality of drive gears 32 of the drive unit 32, 34 protrudes from this rounded lower connecting portion 38 to engage with the modular elements 14 of the conveyor belt 12. The rounded upper connecting portions 28, 30, instead, do not require drive gears, since their relatively small diameter does not generate excessive friction towards the modular elements 14 of the conveyor belt 12 which, therefore, slides freely and without "jumps" on these rounded upper connecting portions 28, 30.

In a preferred embodiment of the motorized transfer apparatus 10, the overall length of the conveyor belt 12 is between about 133 mm and about 400 mm. In detail, also taking into account the aforementioned specific dimensions of the rounded upper connecting portions 28, 30 of the sliding surface 18, each modular element 14 preferably has a length L of about 8 mm, whereas the conveyor belt 12 comprises twenty-eight interconnected modular elements 14, so that the overall length of this closed loop conveyor belt 12 is equal to about 224. Again according to this preferred embodiment of the motorized transfer apparatus 10, the first flat portion 20 of the sliding surface has a length, measured along the feeding direction A of the conveyor belt 12, which is comprised between about 70 mm and about 150 mm.

Figure 2:
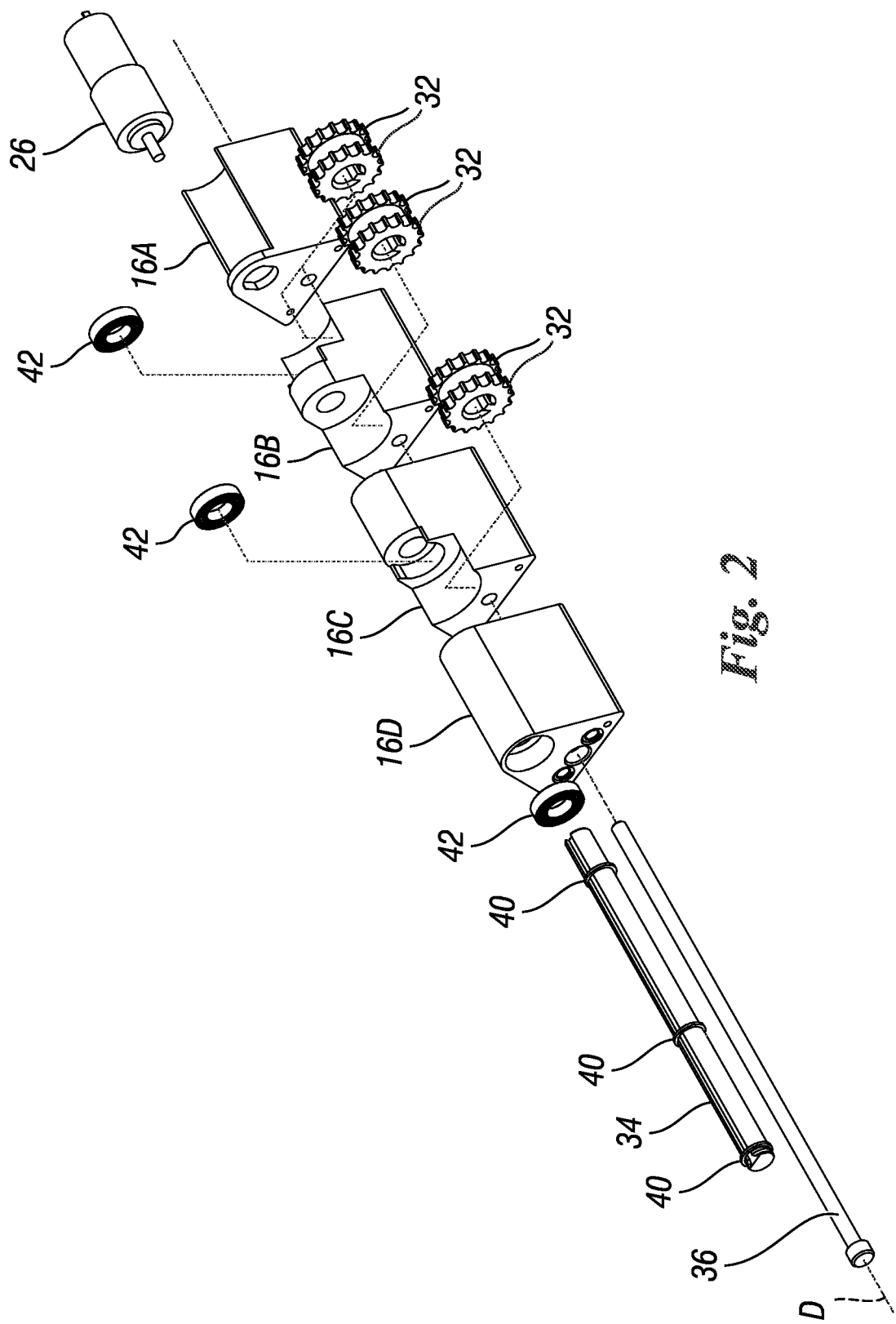
FIG. 2 is an exploded view of the internal components of the motorized transfer apparatus of FIG. 1.

As shown in FIG. 2, the support structure 16 can be of the modular type. In other words, the support structure 16 can comprise two or more modules 16A-16D aligned and interconnected along an interconnection direction D which is substantially perpendicular to the feeding direction A of the conveyor belt 12. The modules 16A-16D can be reciprocally joined by at least one screw 36 oriented along the aforementioned interconnection direction D.

In detail, for reasons of compactness of the support structure 16, at least one module 16A at least partially encloses the motorized actuator device 26, whereas one or more modules 16B-16D can at least partially enclose the drive gears 32 and the drive shaft 34 of said drive unit 32, 34. However, it is possible that the motorized actuator device can also be housed outside the support structure 16.

It has thus been seen that the motorized transfer apparatus for conveyors of bulk objects according to the present invention achieves the purposes previously highlighted.

The motorized transfer apparatus for conveyors of bulk objects of the present invention thus conceived is however susceptible of numerous modifications and variations, all of which falling within the same inventive concept; furthermore, all the details can be replaced by technically equivalent elements. In practice, the materials used, as well as the shapes and dimensions, may be any according to the technical requirements. The scope of protection of the invention is therefore defined by the attached claims.

The invention claimed is:

1. A motorized transfer apparatus (10) comprising:
    - a conveyor belt (12) movable along a predetermined feeding direction (A), said conveyor belt (12) comprising a plurality of modular elements (14) arranged in sequence and articulated with one another to form a closed loop conveyor belt (12) with articulated links having a predetermined overall length;
    - a support structure (16) comprising at least one sliding surface (18) for said conveyor belt (12), said sliding surface (18) having a substantially cross-sectional triangular shape, that is, a section which is parallel with respect to said feeding direction (A), so as to form in sequence:

a first flat portion (20) of the sliding surface, which is substantially horizontal in the operating configuration of the motorized transfer apparatus (10) and which defines a transport plane for the objects transported by said conveyor belt (12), a second flat portion (22) of the sliding surface, which is inclined downward in the operating configuration of the motorized transfer apparatus (10) and defines a descent path for said conveyor belt (12), and a third flat portion (24) of the sliding surface, which defines an ascent path for said conveyor belt (12);

at least one motorized actuator (26) for said conveyor belt (12); and at least one drive unit (32, 34), inserted inside said support structure (16) and arranged to transmit the motion generated by said motorized actuator (26) to said conveyor belt (12), wherein each modular element (14) has a length (L), measured along said feeding direction (A), which is between 1.5% and about 6% of the overall length of said conveyor belt (12), wherein said third flat portion (24) of the sliding surface connects said second flat portion (22) of the sliding surface with said first flat portion (20) of the sliding surface.

2. The motorized transfer apparatus (10) according to claim 1, characterized in that between said first flat portion (20) of the sliding surface and said second flat portion (22) of the sliding surface, as well as between said third flat portion (24) of the sliding surface and said first flat portion (20) of the sliding surface, respective rounded upper connecting portions (28, 30) are provided, which are smooth and have a cross-sectional arc profile.

3. The motorized transfer apparatus (10) according to claim 2, characterized in that said rounded upper connecting portions (28, 30) have a diameter of about 6 mm.

4. The motorized transfer apparatus (10) according to claim 2, characterized in that between said second flat portion (22) of the sliding surface and said third flat portion (24) of the sliding surface a further rounded lower connecting portion (38) is provided, which is smooth and has a cross-sectional arc profile, wherein said rounded lower connecting portion (38) has a diameter which is greater than the diameter of said rounded upper connecting portions (28, 30) and wherein a plurality of drive gears (32) of said drive unit (32, 34) protrudes from said rounded lower connecting portion (38) to engage with the modular elements (14) of said conveyor belt (12).

5. The motorized transfer apparatus (10) according to claim 1, characterized in that the overall length of said conveyor belt (12) is between about 133 mm and about 400 mm.

6. The motorized transfer apparatus (10) according to claim 1, characterized in that each modular element (14) has a length (L) of about 8 mm and in that said conveyor belt (12) comprises twenty-eight modular elements (14), so that the overall length of said conveyor belt (12) is equal to about 224 mm.

7. The motorized transfer apparatus (10) according to claim 1, characterized in that said first flat portion (20) of the sliding surface has a length, measured along said feeding direction (A), which is between about 70 mm and about 150 mm.

8. The motorized transfer apparatus (10) according to claim 1, characterized in that said support structure (16) comprises two or more modules (16A-16D) aligned and interconnected along an interconnection direction (D) which is substantially perpendicular to said feeding direction (A).

9. The motorized transfer apparatus (10) according to claim 8, characterized in that at least one module (16A) of said support structure (16) at least partially encloses said motorized actuator (26), whereas one or more modules (16B-16D) of said support structure (16) at least partially enclose a plurality of drive gears (32) and at least one drive shaft (34) of said drive unit (32, 34).

10. The motorized transfer apparatus (10) according to claim 8, characterized in that said two or more modules (16A-16D) are reciprocally joined by at least one screw (36) oriented along said interconnection direction (D).

\* \* \* \* \*